United States Patent
Miecznik

(10) Patent No.: US 11,024,044 B2
(45) Date of Patent: Jun. 1, 2021

(54) TECHNIQUES FOR IMAGE CO-REGISTRATION

(71) Applicant: DigitalGlobe, Inc., Longmont, CO (US)

(72) Inventor: Grzegorz Miecznik, Erie, CO (US)

(73) Assignee: DIGITALGLOBE, INC., Westminster, CO (US)

( * ) Notice: Subject to any disclaimer, the term of this patent is extended or adjusted under 35 U.S.C. 154(b) by 3 days.

(21) Appl. No.: 15/716,425

(22) Filed: Sep. 26, 2017

(65) Prior Publication Data
US 2018/0089843 A1      Mar. 29, 2018

Related U.S. Application Data

(60) Provisional application No. 62/400,001, filed on Sep. 26, 2016.

(51) Int. Cl.
| | |
|---|---|
| *G06K 9/32* | (2006.01) |
| *G06T 7/32* | (2017.01) |
| *G06T 7/207* | (2017.01) |
| *G06T 7/35* | (2017.01) |

(52) U.S. Cl.
CPC ............ *G06T 7/32* (2017.01); *G06T 7/207* (2017.01); *G06T 7/35* (2017.01); *G06T 2207/10036* (2013.01)

(58) Field of Classification Search
CPC .............. G06T 7/32; G06T 7/207; G06T 7/35
USPC ............................................... 382/294
See application file for complete search history.

(56) References Cited

U.S. PATENT DOCUMENTS

| | | | | |
|---|---|---|---|---|
| 6,738,532 B1* | 5/2004 | Oldroyd | ............... | G06K 9/6203 345/634 |
| 2005/0271248 A1* | 12/2005 | Teku | ............... | F41G 7/346 382/103 |
| 2008/0039960 A1* | 2/2008 | Kadir | ............... | G06F 17/18 700/73 |
| 2011/0096205 A1* | 4/2011 | Kumar | ............... | G06T 5/002 348/241 |
| 2012/0257063 A1* | 10/2012 | Moriwake | ............... | H04N 13/15 348/159 |
| 2013/0108013 A1* | 5/2013 | Leng | ............... | A61B 6/032 378/19 |
| 2013/0236095 A1* | 9/2013 | Hitomi | ............... | G06T 5/002 382/167 |

(Continued)

*Primary Examiner* — Stephen P Coleman
(74) *Attorney, Agent, or Firm* — Snell & Wilmer L.L.P.

(57) ABSTRACT

Techniques for improving image co-registration. One aspect relates to improving Mutual Information techniques by making the histogram bin widths used therein depend on the amount of signal noise. Another aspect relates to populating the bins by integrating the signal probability in each bin. A third aspect relates to converting top-of-the-atmosphere image data to surface reflectance data, and then using surface reflectance data in the Mutual Information technique for determining a correlation surface. The fourth aspect relates to registering higher-resolution images with lower-resolution images by down-sampling the higher-resolution image. The last aspect relates to a technique for determining the accuracy of the co-registration by synthesizing a perfectly-registered image in a second wavelength band from an image in a first wavelength band and then using Mutual Information between the two images to create a correlation surface.

19 Claims, 20 Drawing Sheets

(56) References Cited

U.S. PATENT DOCUMENTS

| | | | |
|---|---|---|---|
| 2014/0282586 A1* | 9/2014 | Shear | G06F 16/248 718/104 |
| 2015/0161768 A1* | 6/2015 | Ardouin | G06K 9/46 382/113 |
| 2015/0211974 A1* | 7/2015 | Knochenmuss | G01N 15/02 250/282 |
| 2015/0317778 A1* | 11/2015 | Lee | G06T 5/002 382/169 |
| 2016/0132359 A1* | 5/2016 | Asahara | G06F 11/3419 709/201 |

* cited by examiner

TECHNIQUES FOR IMAGE CO-REGISTRATION

CROSS-REFERENCE TO RELATED APPLICATIONS

This application claims the benefit of U.S. Provisional Application No. 62/400,001, filed Sep. 26, 2016, the contents of which are incorporated herein by reference in its entirety.

BACKGROUND

The use of satellite-based and aerial-based imagery of the Earth is popular among government and commercial entities. One of the many applications of such imagery is for automated identifying and classifying objects and identifying materials in such images. Material identification and object classification may use information from multiple wavelength bands of one or more image sensor, each wavelength band corresponding to a different portion of the reflected solar or thermal black body spectrum.

One issue that must be solved in order to accurately classify objects and identify materials in satellite imagery is to accurately co-register images from the different spectral bands. Modern satellite imagery typically involves images in each of a plurality of different spectral bands, since various objects and ground cover on the Earth have different spectral responses in these different spectral bands. As discussed further below, because the sensors in different spectral bands can be physically offset from each other at all instants in time, the images from the different spectral bands are always captured from slightly different angles and slight different times. A similar situation can occur with images from different satellites or from the same satellite but acquired at a different time of the day or year.

In this case, registration refers to aligning the coordinate systems for the different images (in x,y space, north-south, east-west space, or in any other coordinate system). Again, this co-registration issue arises because satellite images may be collected with multiple different sensors (for example in DigitalGlobe's WV-3 satellite) that at any given instant in time view different points on the ground. For example, a satellite may contain many separate sensors. Each sensor may have one or more bands (e.g., 3-15 bands). In this case. Further, one or more of the sensors may be populated with multispectral VNIR sensors, having a ground resolution of 1.24 meters. VNIR has a fairly standard meaning in the industry of the portion of the electromagnetic spectrum from roughly 400 to 1100 nanometers in wavelength. And multispectral refers to the use of multiple narrower wavelength ranges throughout the range. For example, it might refer to eight specific wavelength bands within the 400-1100 nanometer range (e.g., coastal (approximately 400-452 nm), blue (approximately 448-510 nm), green (approximately 518-586 nm), yellow (approximately 590-630 nm), red (approximately 632-692 nm), red edge (approximately 706-746 nm), near infrared 1 (NIR1) (approximately 772-890 nm), and near infrared 2 (NIR2) (approximately 866-954 nm)). Also, one or more of the bands in one or more of the banks may be populated with panchromatic sensors, having a ground resolution of 0.31 meters. Panchromatic has a fairly standard meaning in the industry of a relatively broad spectral band that may include all or most of the visible spectrum (450 to 700 nanometers) and possibly other regions adjacent to the visible spectrum (e.g., 450 to 800 nanometers). Also, one or more of the bands in may be populated with SWIR sensors, having a ground resolution of 3.7 meters. SWIR has a fairly standard meaning in the industry of the portion of the electromagnetic spectrum from roughly 1100 to 3000 nanometers in wavelength.

With an integrated sensor containing each of these sensors, and with the sensor field-of-view typically swept across the Earth's surface in "push broom" fashion, the raw image data gets calibrated to register the pixels from one band with the pixels of another band. This processing typically includes assumptions that the optical subsystem on the satellite is stable and that each band obtained image data of a given spot on the ground from a different viewing angle than another band. Necessarily, many if not all of these different viewing angles will be from a non-nadir position.

Because the surface of the Earth (and the objects thereon) does not lie in a single two-dimensional plane, an elevation model of the Earth is used to assist in determining the position on the Earth being imaged by a particular pixel. Even with a perfect elevation model, some error in image registration may occur, with the amount depending on the flat or hilly nature of the terrain and unaccounted for errors in the optical subsystem modeling. Unfortunately no model is perfect. Imperfect elevation models result in warping and distortion between the images of different bands, whereas optical instability will shift an entire image between different bands. This warping and distortion impedes object classification and material identification efforts and other image analysis efforts.

It is against this background that the improvements disclosed herein have been developed.

SUMMARY

Disclosed herein is a computer-implemented method for co-registering images, the method including: retrieving at least two images of an area of interest, each of the images being imaged from a different bank of sensors; creating a signal intensity histogram of each image, with each histogram being divided into a plurality of bins, with each bin having a bin width; cross correlating the two images by cross correlating the two histograms to create a correlation map that represents Mutual Information in the two images; and using the peak on the correlation map to register the images with each other. The width of each bin depends on an amount of noise in the signal intensity within that bin.

The width of each bin may increase with increasing noise. The bins may be populated by integrating a probability of the signal intensity in each bin. The method may further include converting each of the images from top-of-the-atmosphere image data to surface reflectance image data. The images may include image data at a different spatial resolution from the other image, so that there is a higher-resolution image and a lower-resolution image. The width of each bin may increase with increasing signal. The width of each bin may be related to the square root of the signal. The bins may be populated by integrating a probability of the signal intensity in each bin.

Also disclosed is a computer-implemented method for co-registering images, the method including: retrieving at least two images of an area of interest, each of the images being imaged from a different bank of sensors; creating a signal intensity histogram of each image, with each histogram being divided into a plurality of bins, with each bin having a bin width; cross correlating the two images by cross correlating the two histograms to create a correlation map that represents Mutual Information in the two images; and using the peak on the correlation map to register the images with each other. The bins are populated by integrating a probability of the signal intensity in each bin.

Also disclosed is a computer-implemented method for co-registering images, the method comprising: retrieving at least two images of an area of interest, each of the images being imaged from a different bank of sensors; converting each of the images from top-of-the-atmosphere image data to surface reflectance image data; creating a signal intensity histogram of each image, with each histogram being divided into a plurality of bins, with each bin having a bin width; cross correlating the two images by cross correlating the two histograms to create a correlation map that represents Mutual Information in the two images; and using the peak on the correlation map to register the images with each other.

Also disclosed is a computer-implemented method for co-registering images, the method comprising: retrieving at least two images of an area of interest, each of the images being imaged from a different bank of sensors and each of the images including image data at a different spatial resolution from the other image, so that there is a higher-resolution image and a lower-resolution image; down-sampling the higher-resolution image to create a lower-resolution version of the higher-resolution image; creating a signal intensity histogram of each of the lower-resolution image and the lower-resolution version of the higher-resolution image, with each histogram being divided into a plurality of bins, with each bin having a bin width; cross correlating the two images by cross correlating the two histograms to create a correlation map that represents Mutual Information in the two images; and using the peak on the correlation map to register the images with each other.

The down-sampling the higher-resolution image to create the lower-resolution version of the higher-resolution image is performed while performing a simultaneous translation and/or rotation of the higher-resolution image.

Also disclosed is a computer-implemented method for co-registering images, the method comprising: retrieving at least two images of an area of interest, each of the images being imaged from a different bank of sensors; creating a signal intensity histogram of each image, with each histogram being divided into a plurality of bins; cross correlating the two images by cross correlating the two histograms to create a correlation map that represents Mutual Information in the two images; using the peak on the correlation map to register the images with each other; and determining the accuracy of the co-registration by synthesizing a perfectly-registered image in a second wavelength band from an image in a first wavelength band and then using Mutual Information between the two images to create a correlation surface.

BRIEF DESCRIPTION OF THE DRAWINGS

The disclosure herein is described with reference to the following drawings, wherein like reference numbers denote substantially similar elements.

DETAILED DESCRIPTION

Figure 1:
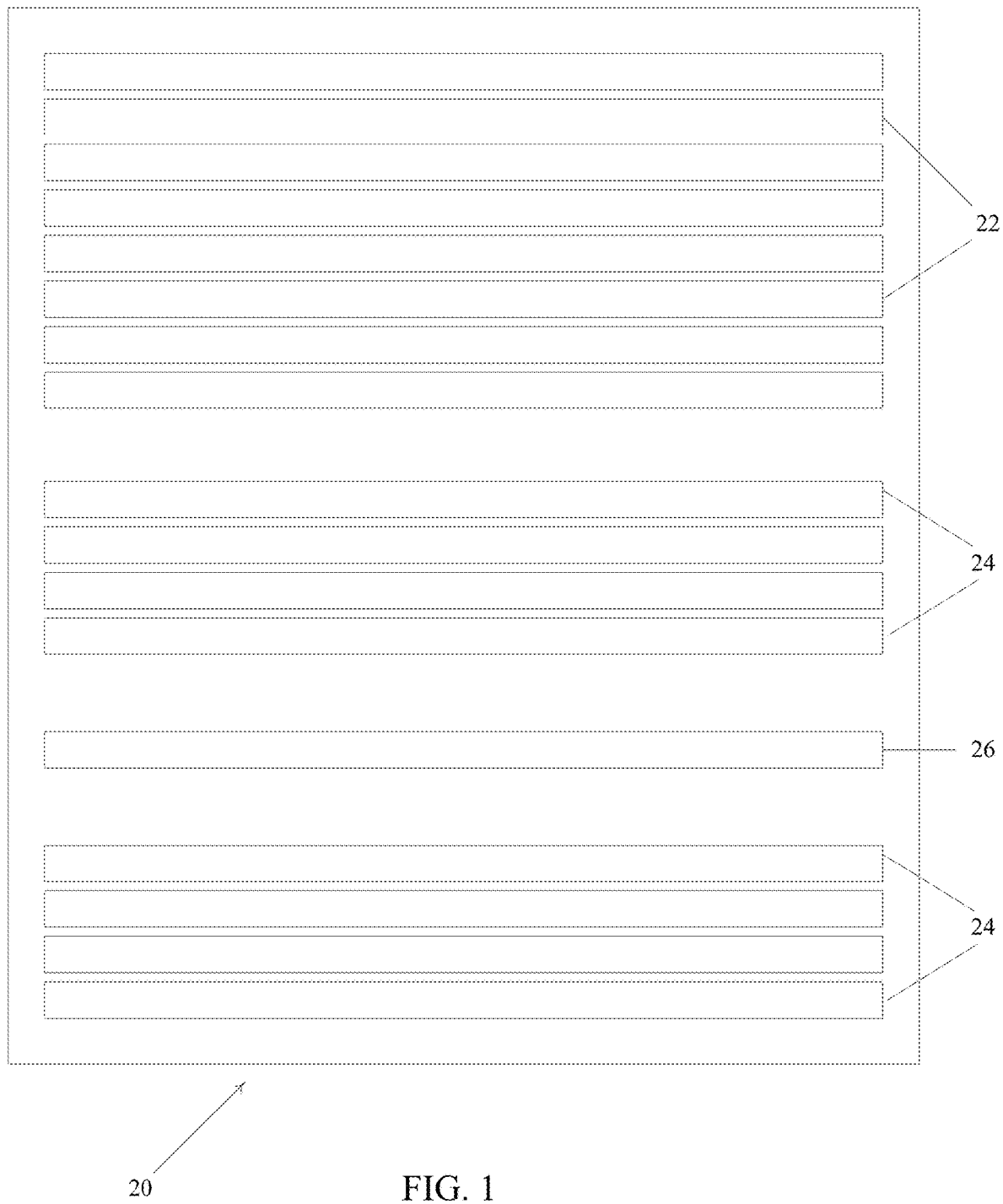
FIG. 1 is a view of multiple sensors in different bands.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

This disclosure relates to several aspects for improving techniques for image co-registration. One aspect relates to improving Mutual Information techniques by making the histogram bin widths used therein depend on the amount of signal noise. The noise considered includes the shot noise associated with the sensor being used, and allows for the fact that the shot noise level increases with increasing signal level. Another aspect relates to recognizing that the statistical Gaussian deviation ($\sigma$) of the signal is equal to the signal noise, and using this aspect to smooth image histograms. While smoothing image histograms is known in the open literature, using the sensor noise to determine a convolution kernel of the smoothing algorithm is an improvement to existing methods. A third aspect relates to converting top-of-the-atmosphere reflectance data to surface reflectance data, and then using surface reflectance data in the Mutual Information technique for determining a correlation surface. The fourth aspect relates to registering bi-modal images of different spatial resolutions. Traditionally, low-resolution images first need to be up-sampled to a high-resolution image (for example through a spline interpolation), before registration offset can be computed. Spline interpolation, or most any other interpolation, introduces unwanted artifacts in the spectrum, which can be avoided by registering high-resolution image to low resolution image, using an averaging technique. The last aspect relates to a Neural Networks technique for determining the accuracy of the co-registration by synthesizing a perfectly-registered image in a second wavelength band from an image in a first wavelength band and then using Mutual Information between the two images to create a correlation surface. This correlation surface shows the amount of registration error.

FIG. 1 shows, by way of non-limiting example, a layout of a composite image sensor arrangement 20 of different sensor banks in a satellite system used for remote sensing. As can be seen, there may be eight banks 22 of sensors in a first wavelength range and at a first resolution, then four banks 24 of sensors in a second wavelength range and at a second resolution, then a single bank 26 of panchromatic sensors across a broad wavelength range at a third resolution, and then four more banks 24 of sensors in the second wavelength range and at the second resolution. This is but one example of an arrangement of sensors in a satellite.

Figure 2:
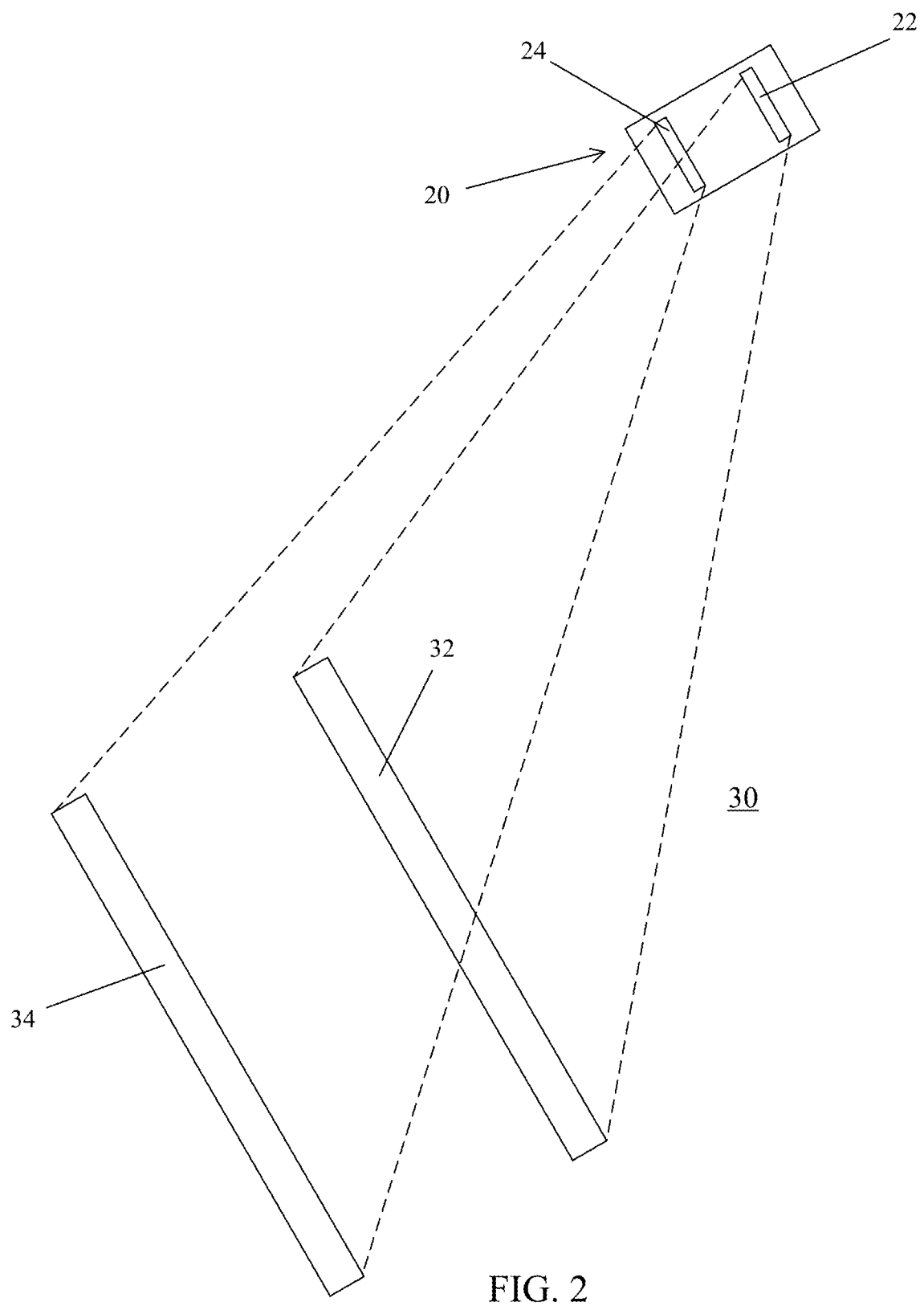
FIG. 2 is a view of different sensors imaging different swaths on the ground.

FIG. 2 shows the image sensor arrangement 20 in a satellite above the Earth 30. It can be seen that at any given instant in time, a particular sensor bank 22 may be positioned to obtain an image of a swath 32 of land and a particular sensor bank 24 may be positioned to obtain an image of a swath 34 of land.

Figure 3:
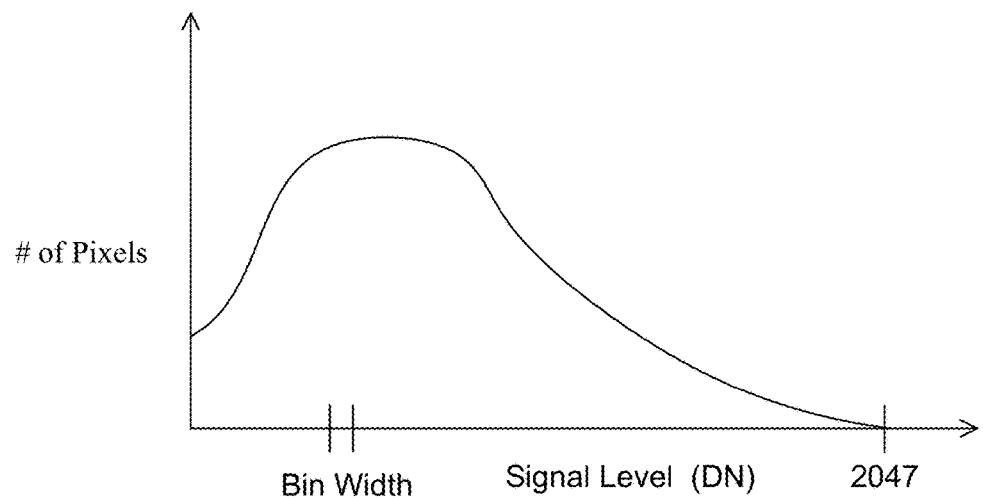
FIG. 3 is a plot from a sample image of the frequency of pixels having a particular signal level and illustrating a bin.

Normalized cross correlation has been used to find the best correlation between two different images. A correlation map is created which reveals a location of peak correlation. If the location of the peak is not at the x,y point of 0,0, then the images are shifted relative to each other until the peak is at 0,0. Such cross correlation techniques have been improved upon through the use of Mutual Information techniques, which use histograms. A histogram is a graphical representation of the distribution of numerical data. It is an estimate of the probability distribution of a continuous variable and is used to compute an entropy of an image in the context of Mutual Information. To construct a histogram, the first step is to "bin" the range of values—that is, divide the entire range of values into a series of intervals—and then count how many values fall into each interval (see FIG. 3). The bins are usually specified as consecutive, non-overlapping intervals of a variable. The bins (intervals) are typically adjacent, and are of equal size.

It has been determined that the sensitivity of the MI correlation surface to image rotation or shift, its slope and smoothness is dependent on bin size. MI computed with a few bins, for example a power of 2, such as traditionally used 8, 16, 32, 64, is relatively smooth, but not very sensitive to small shift or rotation in the image. On the other hand, using a large number of bins, such as 128 or more, makes the MI correlation surface more sensitive to image shift and rotation, but the corresponding correlation surface may have multiple local maxima, which makes determination of the global maximum difficult. We attempted to quantitatively determine an optimal bin size and determined that the bin size should be related to (and increase with) the noise level and that we could use the specified noise level ("shot" noise) for the particular image sensors that captured the image. One model is basically:

$$\text{Bin width} = 3 * \text{Noise} = 3 * (a + b(\text{signal}))^{1/2} \quad (1)$$

where a and b are constants

Figure 4:
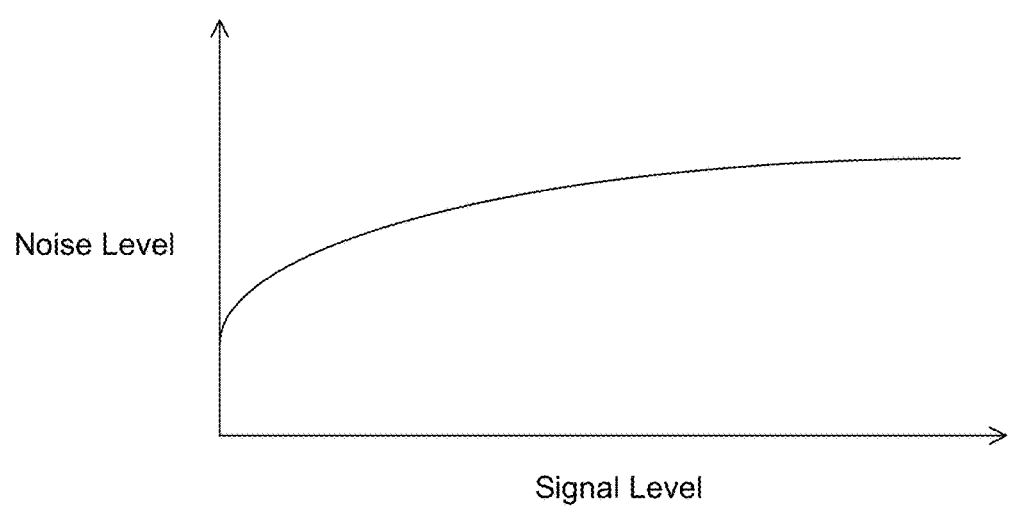
FIG. 4 is a plot of noise level versus signal level in a sample image.
Figure 5:
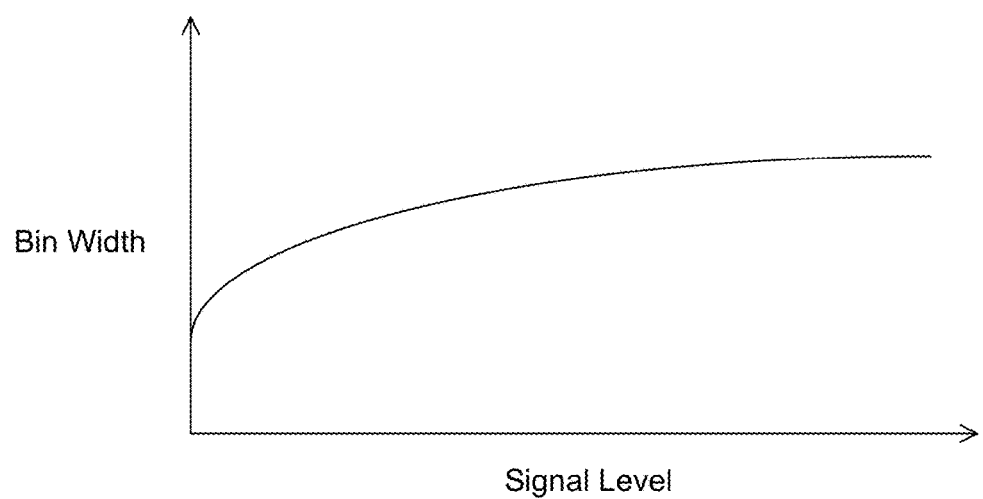
FIG. 5 is a plot of bin width versus signal level in a sample image.

Thus, the noise level increases with signal level (see FIG. 4). The multiplicative constant of 3 is related to the 3-sigma standard deviation of the signal level. Accordingly, the bin size (width) should increase with signal level. In one embodiment, bin size should increase with the square-root of the signal level (see FIG. 5). It has been found that improved correlation surfaces are created when the bin sizes are selected in this manner.

While some have speculated as to what the appropriate bin size should be for registering images, it is believed that no one has previously allowed the bins to vary in size (width) depending a parameter. Further, it is believed than no one has tied the width of the bins to the signal noise.

In situations where there is a high amount of aerosols in the atmosphere (measured in Aerosol Optical Depth (AOD)), the bin widths can be even further optimized. In high AOD situations, additional noise is introduced and is widely spread around the shot noise, which entails changes to histogram binning, as described below.

First of all, consider that an optimal alignment (registration) can be found at the line/sample offset, or rotation, where the MI reaches its maximum. To ensure a fast and accurate search for the MI peak, the MI surface has to be continuous. The MI surface is continuous when its building blocks (histograms) are continuous. Standard histograms are related to the frequency of occurrence of a signal at each bin. Such "frequency" histograms are not quite differentiable, because the binning is discretized to begin with and the signal itself, as recorded by any sensor, is also discretized and represented by Digital Numbers (DN). To make the histograms differentiable, and at the same time connected to signal noise, we populate the bins by integrating the signal probability in each bin. Since a signal has a statistical Gaussian deviation, with a width of the signal noise, the signal will populate any bin continuously. Such histograms are now differentiable and connected to the noisy nature of the sensor. Thus, we use sensor noise to derive Gaussian probability and apply it to remote sensing image registration.

It has also been discovered that MI techniques for remote sensing applications can be enhanced by replacing the (DN) from the sensor that represents top-of-atmosphere (TOA) reflectance with a more accurate representation of the surface that is being sensed (e.g., surface reflectance). For clear atmospheric conditions (images), TOA-based MI techniques and surface reflectance-based MI techniques yield nearly the same results. But for hazy and high AOD conditions, the surface reflectance-based MI techniques are sharper and more accurate. The reason is that the atmosphere blurs the images, which causes the MI function to flatten out, which makes it more difficult to find the maximum of the MI surface, which is needed to accurately co-register the images.

Blurring is mainly caused by "adjacency effects," which causes scattering of light from pixels outside of the field of view (FOV) into the FOV. For low AOD, scattering from far pixels (those outside the FOV) is small, but for high AOD and haze, these effects are clearly noticeable. The atmospheric compensation will largely eliminate the adjacency effects, sharpen the MI surface, and provide a better co-registration. Further detail on adjacency effects, atmospheric compensation, and converting TOA radiance to surface reflectance can be found in U.S. Pat. No. 9,396,528, the entire contents of which are incorporated herein by reference.

The next discovery was a novel approach to register images with different spatial resolutions. In a traditional workflow, prior to computing the offset or rotation angle between images one has to bring the different-resolution images (e.g., VNIR and SWIR images) to a common geographic grid, which involves a resampling of the lower-resolution image to create a "higher-resolution" image therefrom. Once processed, every pixel in VNIR image will occupy occupies the same geographic extent in the SWIR pixel. This process can be accomplished by traditional resampling methods, such as spline interpolation. Once the two images are on the same spatial (geographic) grid, the alignment offset and/or rotation angle can be computed by searching for a maximum of MI on a sub-pixel grid. Again, this involves another resampling, this time from a common grid into a sub-pixel grid, since both images can be offset from each other by a fraction of a pixel. Both these resampling steps introduce interpolation artifacts, which degrade the accuracy of the MI technique, and distort the radiometric properties of the original image, which undergoes two interpolations after leaving the factory.

It has been discovered that it is preferable to simultaneously down-sample a high resolution image (e.g., a VNIR image) and translate and or rotate it to a common geographic grid determined by a low-resolution image, thus opposite to the traditional method described in the previous paragraph. It has been discovered that the latter method (simultaneous down-sampling and shift/rotation of the higher-resolution image) is much faster and more accurate.

Accuracy of the MI-based registration technique (and other techniques too) has not been fully quantified in remote sensing applications and only qualitative description have been discussed in the literature. A more robust assessment method is highly desirable, especially for images with different modalities, where certain objects, both natural and man-made may cause an "apparent" shift between images. A good manifestation of this problem is an image of checkerboard pattern, where black-and-white squares in one image (for example VNIR) would appear as white-and-black in the other image (SWIR). Such a hypothetical but possible image pair would appear to be offset from other by exactly one pixel. For natural scenes and with an imperfect sensor, determination of registration accuracy for bi-modal (VNIR) and SWIR images acquired over nominal conditions is difficult because of the existing offset between these two images. It has been determined that the accuracy of the co-registration can be assessed by running the MI technique on synthetic, but perfectly-aligned VNIR and SWIR images. This perfectly-aligned image pair can be created by synthesis of one of the image pair from the other, using Neural Networks trained on actual VNIR and SWIR images. A synthetic SWIR image, which maintains spectral characteristics of the original SWIR image, but which is geometrically aligned with the VNIR image, is created by training Neural Networks coefficients on the original, mis-aligned VNIR/SWIR pair, and then synthesizing a new SWIR image from the VNIR image, using the previously generated neural coefficients. This methods maintains proper geometric alignment of VNIR and SWIR spectra, since the neural coefficients are only applied to the spectral domain, but not the geometric domain. In other words, the Neural Networks know how a given SWIR image would look like if it were a VNIR image, We have demonstrated that as long as the digital elevation model does not deform images, and clouds and water are masked out, global VNIR to SWIR registration of remote sensing images can be achieved to within ¼th of a SWIR pixel.

Further detail related to the techniques discussed herein is now provided. WorldView-3 (WV-3) is a DigitalGlobe commercial, high resolution, push-broom imaging satellite with three instruments: visible and near-infrared VNIR consisting of panchromatic (0.3 m nadir GSD) plus multi-spectral (1.2 m), short-wave infrared SWIR (3.7 m), and multi-spectral CAVIS (30 m). Nine VNIR bands, which are on one instrument, are nearly perfectly registered to each other, whereas eight SWIR bands, belonging to the second instrument, are misaligned with respect to VNIR and to each other. Geometric calibration and ortho-rectification results in a VNIR/SWIR alignment which is accurate to approximately 0.75 SWIR pixel at 3.7 m GSD, whereas inter-SWIR, band to band registration is 0.3 SWIR pixel. Numerous high resolution, spectral applications, such as object classification and material identification, require more accurate registration, which can be achieved by utilizing image processing algorithms, for example Mutual Information (MI). Although MI-based co-registration algorithms are highly accurate, implementation details for automated processing can be challenging. One particular challenge is how to compute bin widths of intensity histograms, which are fundamental building blocks of MI. We solve this problem by making the bin widths proportional to instrument shot noise. Next, we show how to take advantage of multiple VNIR bands, and improve registration sensitivity to image alignment. To meet this goal, we employ Canonical Correlation Analysis, which maximizes VNIR/SWIR correlation through an optimal linear combination of VNIR bands. Finally we explore how to register images corresponding to different spatial resolutions. We show that MI computed at a low-resolution grid is more sensitive to alignment parameters than MI computed at a high-resolution grid. The proposed modifications allow us to improve VNIR/SWIR registration to better than ¼ of a SWIR pixel, as long as terrain elevation is properly accounted for, and clouds and water are masked out.

WV-3, launched in August 2014, carries three high-resolution electro-optical imaging instruments. The Visible/Near Infrared (VNIR) instrument has a panchromatic (PAN) band at 0.31 m Ground Sample Distance (GSD) at nadir and eight multi-spectral (MS) bands at 1.24 m GSD. The shortwave infrared (SWIR) instrument has eight bands with wavelengths ranging from approximately 1.2 to 2.3 µm at 3.7 m GSD (currently released to non-US government customers only at 7.5 m spatial resolution). The satellite also carries the CAVIS instrument (named for Clouds, Aerosols, Water Vapor, Ice, and Snow) that can be useful for atmospheric measurements, cloud detection, differentiating clouds from ice and snow. This instrument has an additional 12 bands at 30 m resolution. The PAN and MS bands, collectively referred to as Visible/Near Infrared (VNIR) bands, belong to one sensor, and are nearly perfectly registered with each other. The VNIR and SWIR bands belong to two different instruments, and since they observe the same point on the ground at different times and from different look angles, the corresponding images are misaligned. A similar but less severe misalignment is observed between individual SWIR bands, since they also image a ground object at different times and from different angles. If uncorrected, VNIR and SWIR images will be translated and rotated relative to each other, and warped over terrain with variable elevation.

Figure 6:
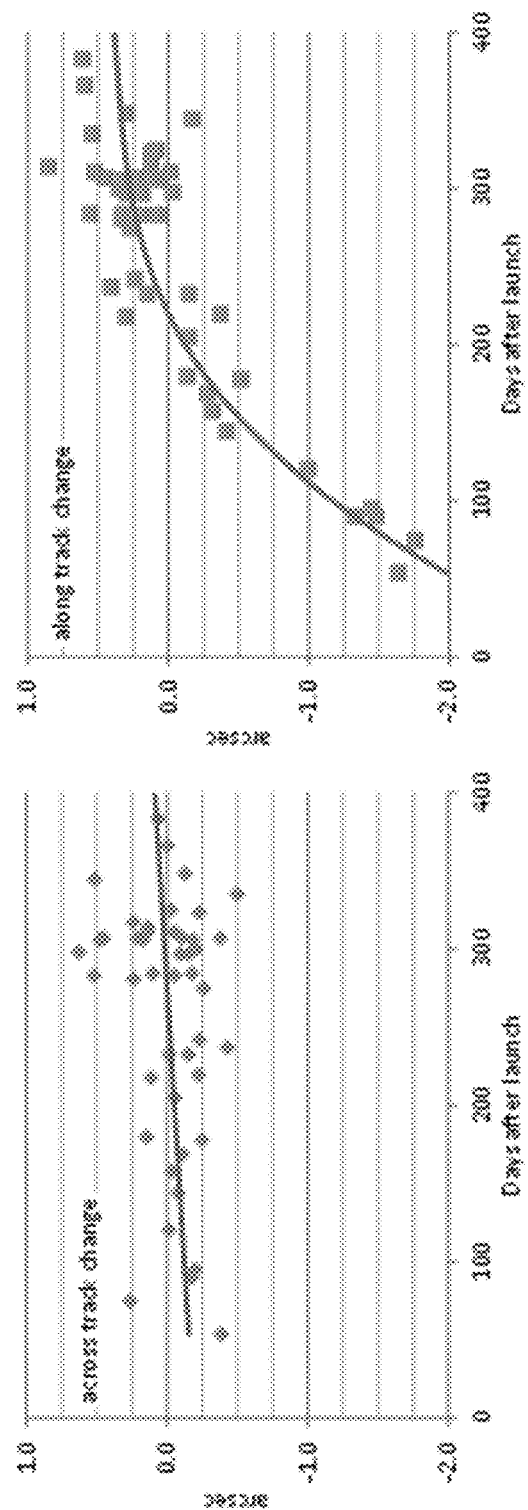
FIG. 6 shows improvement in calibration stability of the SWIR sensor. The y-axis shows convergence angles between VNIR and SWIR sensors in a synthetic sensor model. Random variability around regression curves, which most likely come from thermoelastic changes between the VNIR and SWIR optical benches, can only be corrected on a case-by-case basis by an image processing algorithm.

Factory calibration and ortho-rectification can remove most of this misalignment. FIG. 6 shows an improvement in stability of VNIR/SWIR alignment calibration after the launch date. While the calibration reached a stable point after about 400 days, there remains a bias and random error caused, which is most likely caused by thermoelastic changes in the optical bench between the VNIR and SWIR focal planes. After the calibration and ortho-rectification to an SRTM digital elevation model, residual offsets between VNIR and SWIR are approximately 0.75 SWIR pixel (at 3.7 m GSD) in the along-track direction and 0.3 SWIR pixel in the cross-track direction. There is no rotation between images, and the offset is relatively constant across the image, even for full strip images as large at 100 km×14 km. Alignment inaccuracies are also caused by errors in the elevation model. For a height error of 30 meters, this results in a VNIR/SWIR mis-registration of about ⅙ SWIR pixel for typical image acquisition. In mountainous terrain, this can lead to image warping that can only be removed by non-rigid image transformations. Over flat terrain, this error can be removed by registration employing a rigid body transformation.

Many processing applications of high-resolution imagery, such as change detection, material classification, and mineral identification, require more precise band alignment than is currently provided by the instrument calibration. Additional processing is required to remove this error on an image-by-image basis. This paper summarizes improvements to the Mutual Information (MI) registration technique, which allows us to reduce the registration bias to about ¼ of a SWIR pixel, provided that clouds and water bodies have been masked. Since elevation errors have a small impact on VNIR/SWIR alignment for many cases, this registration technique currently employs only rigid-body transformations. The co-registration procedure that will be described is actually performed on SWIR and MS bands. Since the panchromatic band is already well-registered to MS, this co-registration procedure results in improved alignment between all VNIR bands (MS plus panchromatic) and SWIR bands, and will be referred to as VNIR/SWIR alignment.

This discussion is organized as follows: a review of the MI registration technique; a demonstration of how to estimate histogram density and histogram bin width using sensor noise; an illustration of how to use Canonical Correlation Analysis (CCA) to improve registration of two multi-band images; a demonstration of how to optimally register images of different native resolution; and results of WV-3 registration.

Implementation of the Mutual Information Technique

MI is a similarity metric between images A and B, and is defined as:

$$MI_{A,B} = H(A) + H(B) - H(A,B) \quad (2)$$

$$H(A) = \sum_{a}^{Na} -p_A(a) \log p_A(a) \quad (3)$$

$$H(B) = \sum_{b}^{Nb} -p_B(b) \log p_B(b) \quad (4)$$

$$H(A,B) = \sum_{a,b}^{Na,Nb} -p_{A,B}(a,b) \log p_{A,B}(a,b) \quad (5)$$

where H(A) and H(B) are the Shannon entropy for reference image A and registering image B, respectively, H(A,B) is the joint entropy of the images, and a and b are discrete intensities in images A and B, respectively. Na and Nb are the number of histogram bins, and p is the probability of an image having intensity a, or b. Probability distributions are typically approximated with histograms h:

$$p_A(a) \approx \frac{h(a)}{\sum_a h(a)}; \quad (6)$$

$$p_{AB}(a,b) \approx \frac{h(a,b)}{\sum_{a,b} h(a,b)} \quad (7)$$

$$h(a) = \frac{1}{\Delta^A} \sum_{\Omega_{xy}} \delta_\Delta^A(DN_{xy}^A - a); \quad (8)$$

$$h(a,b) = \frac{1}{\Delta^A \Delta^B} \sum_{\Omega_{xy}} \delta_\Delta^A(DN_{xy}^A - a) \delta_\Delta^B(DN_{xy}^B - b); \quad (9)$$

$$\delta_\Delta(x) = \begin{cases} 1 \text{ if } x \in [0, \Delta] \\ 0 \text{ elsewhere} \end{cases} \quad (10)$$

where DN is a detector chip readout value (digital number), $\Omega_{xy}$ represents image pixels in x (line) and y (sample) directions, and Δ is histogram bin width. When Δ approaches zero, $\delta_\Delta$ becomes a Dirac delta function. The normalization of histograms with $\Delta$ ensures continuity of h when $\Delta$ changes with DN. To eliminate very noisy (relative to the signal) and saturated pixels, we reject the darkest pixels which constitute less than 1% of all pixels, and reject the brightest one percent, as well.

In order to facilitate computation of individual and joint histograms, the reference and registering images need to be at the same spatial resolution. Since the MS and SWIR sensors operate at native resolutions of 1.2 m and 3.7 m, respectively, the simplest approach is to first resample SWIR to MS resolution. Next, another resampling is applied to the registering image to achieve sub-pixel alignment. Later, we show how to circumvent the double resampling and replace it with only one resampling step.

Alignment between images is obtained by changing image pixels of the registering image, using either an affine transformation, or, in general, any parametric warping. Most remote sensing images can be aligned using only an affine transformation, such as translation and rotation:

$$\begin{pmatrix} l \\ s \end{pmatrix}' = \begin{pmatrix} \Delta l \\ \Delta s \end{pmatrix} + \begin{pmatrix} a & 0 \\ 0 & b \end{pmatrix}\begin{pmatrix} l \\ s \end{pmatrix} + \begin{pmatrix} \sin\varphi & \cos\varphi \\ -\cos\varphi & \sin\varphi \end{pmatrix}\begin{pmatrix} l \\ s \end{pmatrix} \quad (11)$$

Here, l is image line, s is image sample, $\Delta l$ and $\Delta s$ are translations in line and simple direction, respectively, a and b are linear drift terms, and $\varphi$ is a rotation angle. For WV-3, we only consider the translation since the instrument calibration and ortho-projection onto a rectangular grid eliminate the need for the other terms. When sampled on a ($\Delta l$, $\Delta s$) grid, $MI_{A,B}(\Delta l, \Delta s)$ represents a two-dimension registration function which peaks at the true offset between the images.

The steeper the registration function, the more accurate the peak position, and the more accurate alignment results. Strong correlation between images results in a steep function profile, whereas weak correlation flattens it out. Since MS and SWIR images correspond to different spectral ranges of the reflected solar radiation, those images are not well correlated in a natural environment. Numerous test cases have shown that the correlation coefficient between MS and SWIR collected on the same orbital pass is typically less than 0.7, and is even less than 0.5 over lushly vegetated surfaces or surfaces with exposed mineral layers. In comparison with other registration methods, such as Normalized Cross Correlation (NCC) or Sum of Squared Differences (SSD), MI results in the steepest registration function, and has been the preferred registration method for images with different modalities across many different applications Selection of Histogram Bin Size There is no clear consensus in the image processing community regarding probability density estimation, although three approaches seem to be most popular. The simplest approach is to divide a histogram into equal interval bins, with widths adjusted based on the problem at hand. Another approach relies on density kernels, where the number of signal occurrences in each bin is convolved with a Gaussian kernel, with bin width depending on the number of dynamic levels of a measured signal. The third approach uses a Generalized Partial Volume technique. All approaches have a common goal to provide a smooth estimate of signal probability, while preserving image statistical information.

We propose to estimate the signal probability based on measurement noise. An image taken with any camera is inherently contaminated with shot noise, which can be characterized as:

$$\sigma(DN) = \sqrt{offset + gain * DN} \quad (12)$$

where offset and gain are instrument constants, depending on optical and electronic subsystems. The VNIR sensor noise is roughly between 1 and 3 DNs, and SWIR noise is between 3 and 16 DNs. We investigated two approaches to handle signal noise. In the first case, we considered an image whose intensity values are binned with noise values. Such an image would be virtually indistinguishable from an original image. In practice, the bin size can be multiplied by a factor of 3 before we see any differences between the original and binned images. Assuming that the noise is larger than the difference between successive DN values, the number of gray levels would roughly equal the number of bins. To apply this notion to MI, we bin intensity histograms in variable intervals, whose widths equal $3\sigma(DN)$. Starting with zero DN, the first histogram bin is between 0 and $0+3\sigma(1)$, the second bin will be between $0+3\sigma(1)$ and $(0+3\sigma(1))+3\sigma(0+3\sigma(1))$, and so on. In the second, more accurate approach we use convolution kernels with a kernel width of 3× sensor noise, and use a Gaussian function to describe the noise distribution. Probability estimates are computed by summing signal probabilities within each bin, as shown:

$$p(b) \equiv \sum_{\Omega_{xy}} g(DN_{xy} - b) = \sum_{\Omega_{xy}} \frac{1}{3\sigma_{xy}\sqrt{2\pi}} \exp\left(-\frac{1}{2}\left(\frac{DN_{xy} - b}{3\sigma_{xy}}\right)^2\right) \quad (13)$$

The bin size of resulting histograms can be anywhere between 1 DN and approximately $3\sigma$ in order to maintain the information content of the signal while providing a smooth and differentiable histogram. For images with constant noise, which is a relatively good approximation for most images studied here, the probability estimate p(b) can be replaced with a histogram convolution $\eta(b)$:

$$\eta(b) = \int_{b'} h(b')g(b-b')db' = \sum_{\Omega_{xy}} \int_{b'} \delta_\Delta(DN_{xy} - b')g(b-b')db' \underset{lim\Delta \to 0}{=} \sum_{\Omega_{xy}} g(DN_{xy} - b) = p(b) \quad (14)$$

This approximation leads a fast computation of probability densities.

Figure 7:
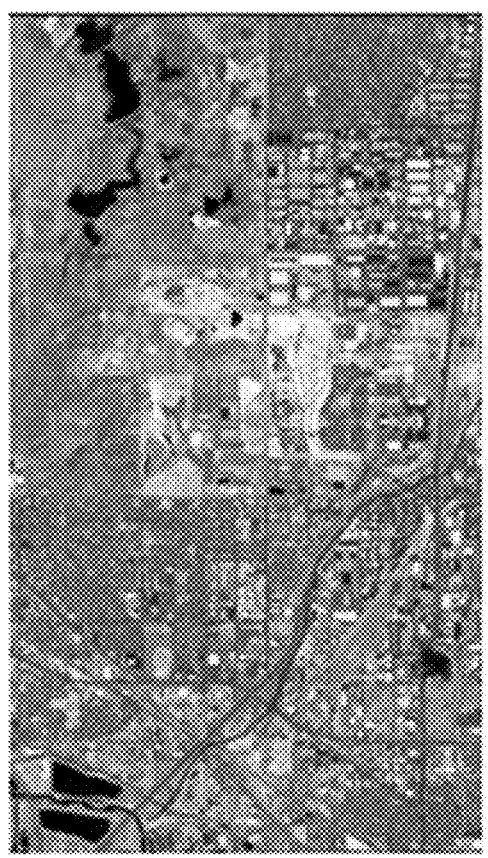
FIG. 7 shows WV-3 image collected over Denver, Colo., displayed at 8 m GSD. Left: a RGB composite of VNIR bands 5, 3, and 2, right: RGB composite of a SWIR bands 8, 5, and 1.
Figure 7:

To illustrate the effect of histogram binning on image alignment, we will consider a WV-3 image collected over Denver, Colo., on Aug. 5, 2015. The image in FIG. 7 represents a mixed environment, being partially urban and partially rural. The image chip is 5000×5000 pixels and covers an area of 10×10 km.

Figure 8:
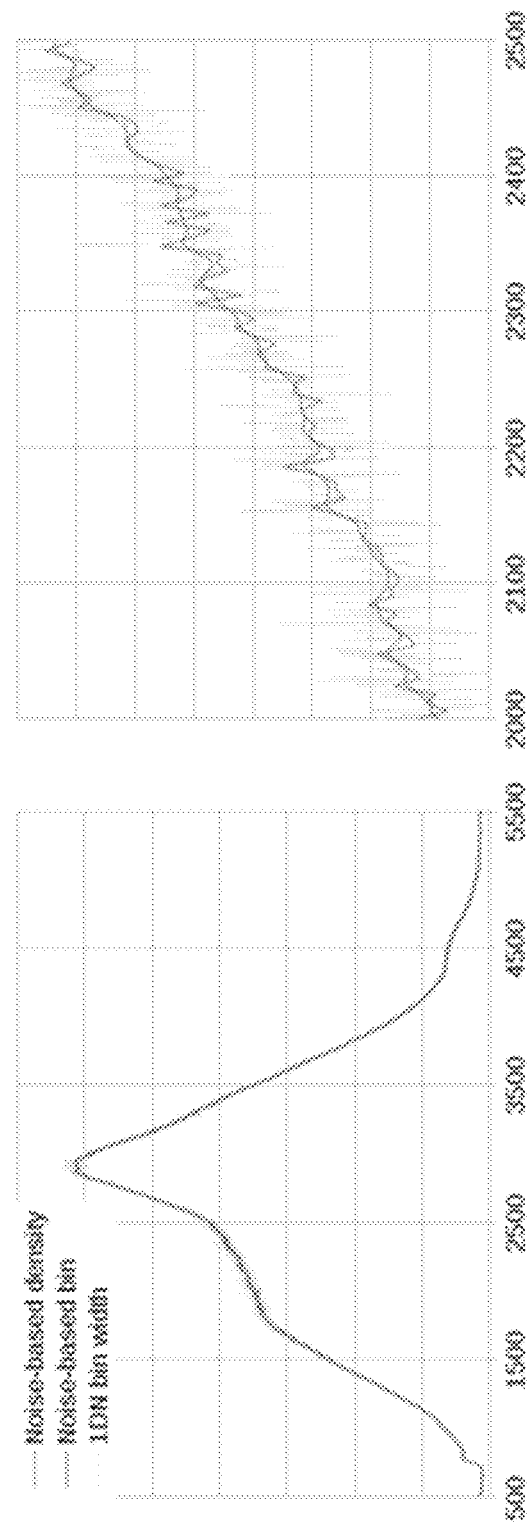
FIG. 8 shows probability densities for $SWIR_1$ of the Denver image of FIG. 7, computed using: (a) histogram bins equidistant and equal 1 D, (b) histogram bins increase with DN and are equal to sensor noise, (c) histograms are computed by summing Gaussian signal probabilities within each 1 DN-wide bin. The right panel shows details at a smaller scale.

FIG. 8 shows probability estimates for SWIR band 1 ($SWIR_1$) computed using three different histogram estimates: (a) histograms with equidistant bins of 1 DN width, (b) histograms with noise-based bins, and (c) density probabilities with noise-based kernels. At a signal scale of about 100 DN, all histograms are very smooth, but small scale details reveal a particularly noisy profile of the histogram with 1 DN bin width. Binning the pixels into intervals based on sensor noise significantly improves the histogram, although high-frequency variability is still persistent as seen in the zoomed inset (for this particular image, the average noise value is about 6 DN for the signal between 2000 and 2500 DN). The smoothest histograms are obtained by applying Gaussian convolution to the probability estimates.

Figure 9:
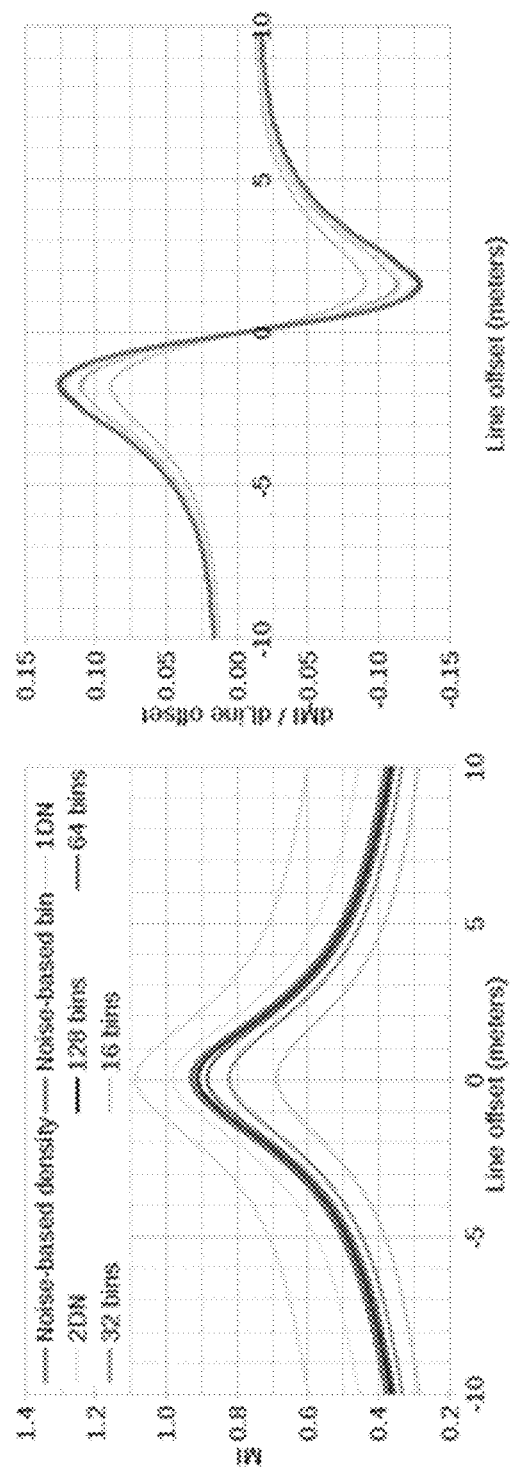
FIG. 9 shows MI registration functions (left) and center-difference derivatives (right), computed in the along-track direction for $VNIR_{AVE}$ and $SWIR_1$ bands of the Denver image with 5000 lines and 5000 samples. The different functions are for different histogram estimates.

We next examine how the different binning strategies affect MI sensitivity with respect to the VNIR/SWIR alignment. FIG. 9 shows registration functions and their derivatives with respect the line offset, computed with the following histogram binning strategies: histograms are partitioned into 16, 32, 64, 128 bins; bins with fixed-length widths of 1 DN and 2 DN; variable-width bins which change according to sensor noise; and, a histogram estimation with Gaussian-convolved signals. To compute the registration functions, we apply a line offset between $SWIR_1$ and VNIR band averages ($VNIR_{AVE}$), and spline-interpolate $SWIR_1$ image to the new grid, for which the new signal probabilities and MI are evaluated.

All functions are very smooth, and increase monotonically on both sides of the peak, which is positioned virtually identically in all cases. MI derivatives, though similar for different binning strategies, clearly show that MI is most sensitive to image alignment when histograms are estimated using signals convolved with a Gaussian kernel with width equal to 3× sensor noise standard deviation. Sensitivity functions are also very smooth, guaranteeing robust convergence of minimization algorithms used to detect peak position.

Figure 10:
FIG. 10 shows Denver image cropped to 400×400 pixels, displayed at 8 m GSD. Left: an RGB composite of VNIR bands 5, 3, and 2; right: RGB composite of SWIR bands 8, 5, and 1.

Previous research suggests that parameterization of the MI method becomes more important as image size decreases. FIG. 10 shows the previous Denver images cropped to 400×400 pixels.

Figure 11:
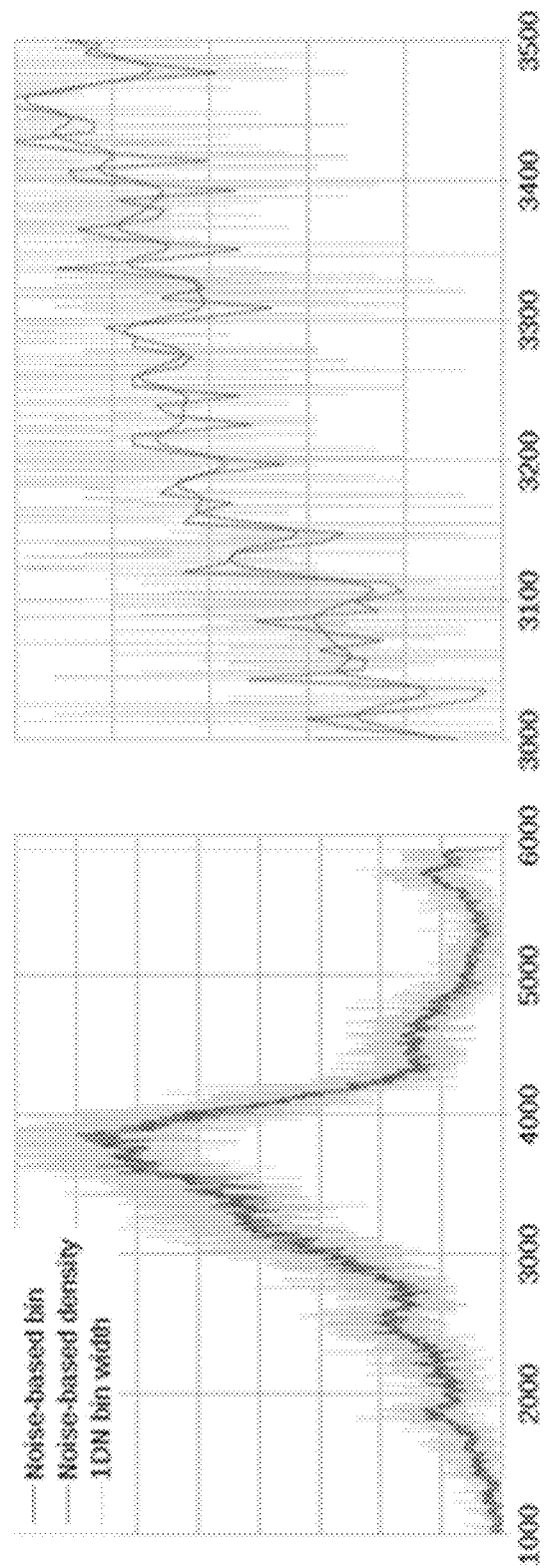
FIG. 11 shows $SWIR_1$ histograms of the 400×400 Denver image, computed using three different estimates: (a) all bins are equidistant and equal 1D, (b) bins increase with DN and equal sensor noise, (c) histograms are computed by summing Gaussian signal probabilities within a 1 DN-wide bin. The right panel is zoomed to a narrow DN range.

FIG. 11 shows the corresponding histograms, computed with the same binning strategies as for the original image. The histograms which are binned in 1 DN intervals are much noisier than for the original image. The same is true for the two other two histogram types, although the noise-based histograms are considerably smoother.

Figure 12:
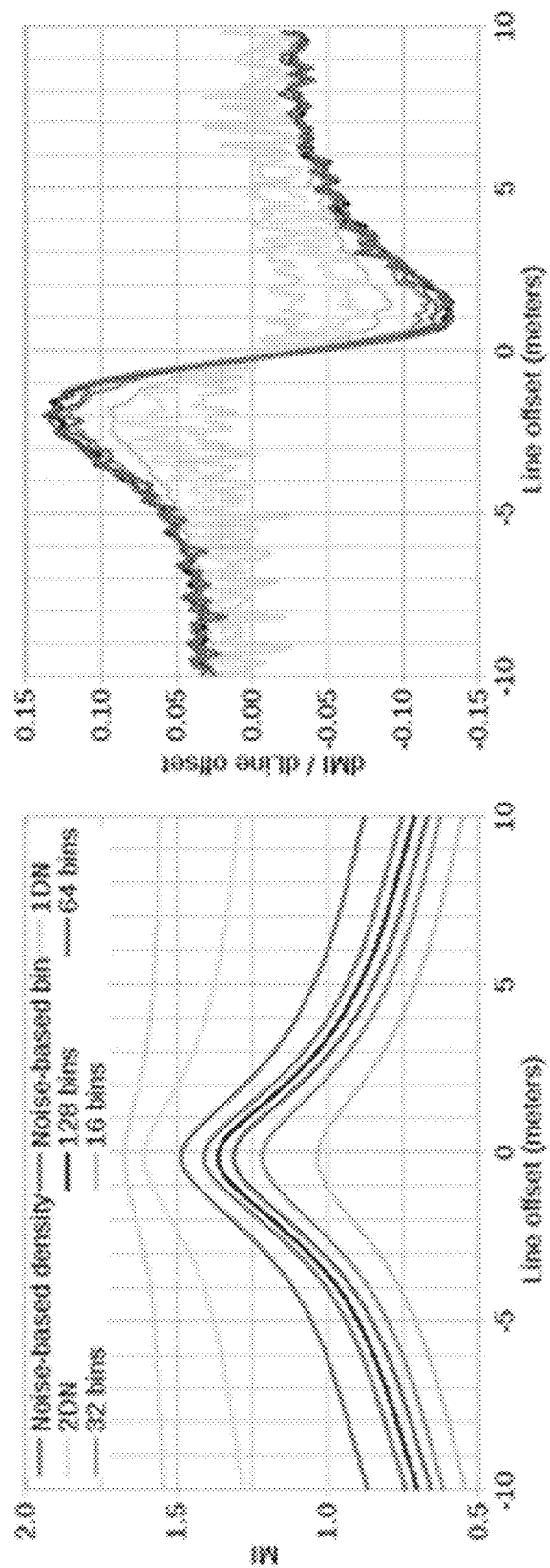
FIG. 12 shows MI registration functions (left) and their center-difference derivatives (right), computed for $VNIR_{AVE}$ and $SWIR_1$ bands of the 400×400 Denver image. The different functions are for different histogram estimates. The registration functions in the left panel were offset relative to each other for clarity of presentation.

The effect of histogram binning on MI is shown in FIG. 12. While registration functions appear to be very smooth, the sensitivity functions are now much noisier for all but the Gaussian-convolved case.

Figure 13:
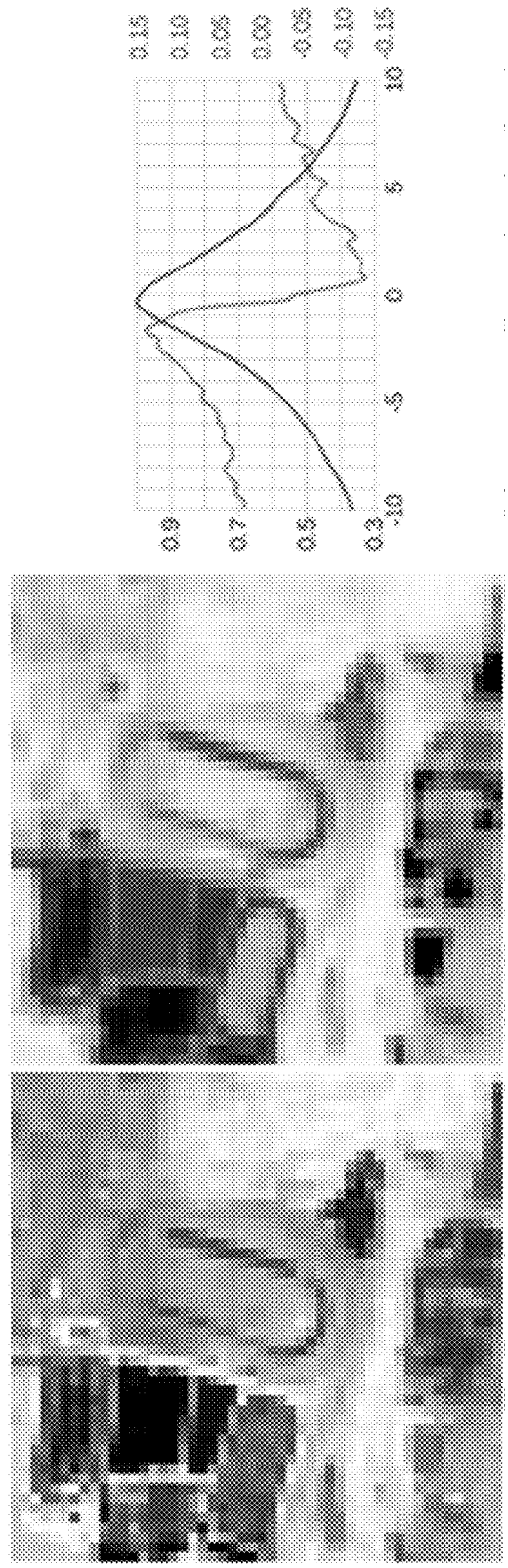
FIG. 13 shows the Denver image cropped to 100×100 pixels, (displayed at 8 m GSD), and the corresponding registration function and its derivative. Left: an RGB composite of VNIR bands 5, 3, and 2; center: RGB composite of SWIR bands 8, 5, and 1; right: MI registration function and its derivative computed using Gaussian-convolved signals.

For extremely small image chips, such as 100×100 shown in FIG. 13, only the Gaussian-convolved signals provide an adequate level of fidelity. While the registration function derivative shows obvious irregularities, the registration function changes monotonously on both sides of the peak, suggesting that reliable results can be computed with standard optimization algorithms for image chips as small as 100×100 pixels.

Registration of Images Belonging to Different Spatial Resolutions

In the previous section, we analyzed effects of histogram binning on sensitivity of registration function with respect to alignment parameters. Using bi-linear interpolation, we first resampled the SWIR image from native resolution at 3.7 m to the 1.2 m resolution of the corresponding VNIR image, and then resampled it again using cubic splines to compute the registration function at a sub-pixel level. Since multiple interpolations blur the image and reduce registration sensitivity, it is desirable to keep the number of re-sampling steps to a minimum.

We propose to combine the two resampling steps into one, and compute the similarity metric at low-resolution GSD. This is achieved by down-sampling the VNIR image to SWIR GSD, while simultaneously translating the image. This method is equivalent to a convolution with a low pass filter, whose width equals the ratio of the low- to high-resolution GSD, and whose center is shifted by alignment vector. This approach has major advantages over conventional two-step resampling; in particular, when two images have substantially different GSDs. First, it yields a more accurate registration surface since the up-sampling, which is only a guess of a true spectrum, is largely replaced by pixel aggregation, which can be more exact if we know the point spread function of the instrument (assumed for now to be a box function). When the difference between GSDs is large, such as for the SWIR and VNIR sensors, the bi-linear aggregation is nearly free from aliasing effects. However, when the GSDs are similar, the bi-linear aggregation should be replaced with a smooth convolution kernel, possibly Lanczos or Gamma functions. Secondly, the proposed approach is much faster, since a bi-cubic interpolation using splines can be replaced with a simpler bi-linear aggregation. Finally, it involves only one resampling, thus reducing aliasing errors and increasing registration sensitivity.

Figure 14:
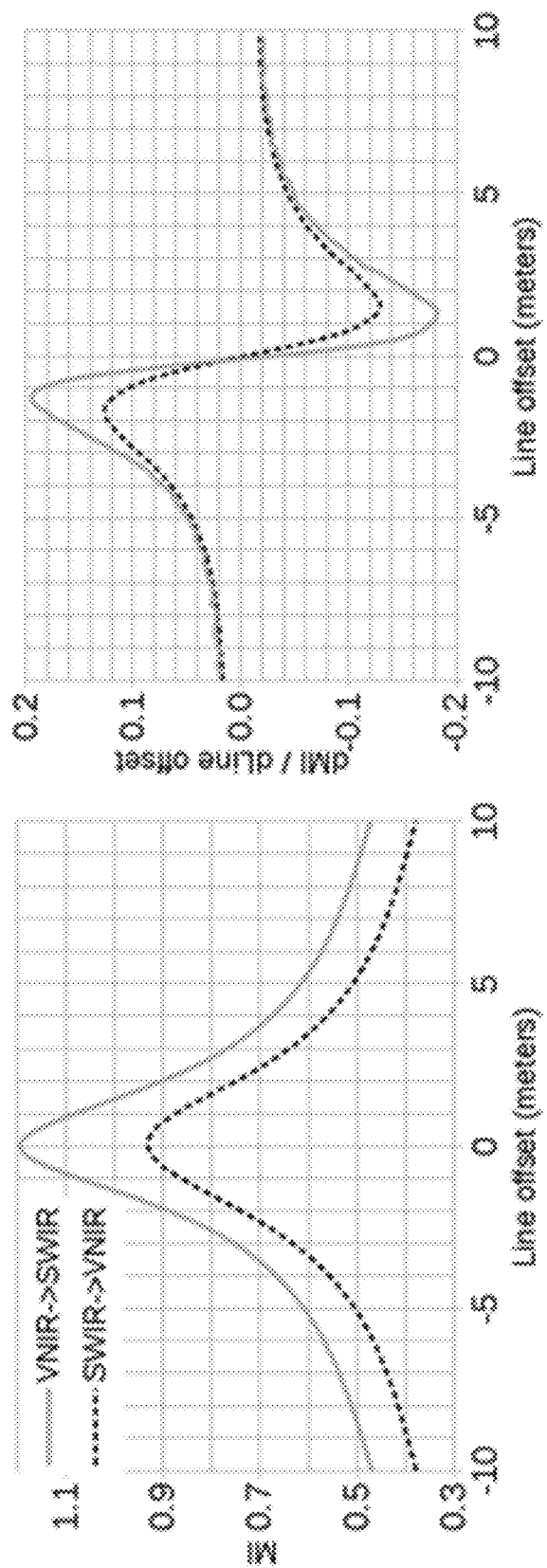
FIG. 14 shows MI registration functions and their derivatives for $VNIR_{AVE}$ and $SWIR_1$ bands of the Denver image, up-sampled using cubic splines (SWIR→VNIR) and down-sampled using pixel aggregation (VNIR→SWIR).

FIG. 14 compares results for the 5000×5000 Denver image using the conventional approach involving two-step up-sampling to high-resolution GSD, with the proposed one-step pixel down-sampling to low-resolution GSD. In both cases, the registration functions are very smooth with only one maximum. The one-step down-sampling method results in functions nearly twice as sensitive as the conventional method, at a fraction of the computational cost.

Multi-Band Image Registration Using Canonical Correlation Analysis

Registration of images with multiple spectral bands presents unique challenges because one registration band may align differently with different reference bands. In the case of WV-3, the $i^{th}$ $SWIR_i$ band may align differently with the $j^{th}$ $VNIR_j$ band. For the same reasons, intra-band alignment may produce different results for different $SWIR_i$/$SWIR_j$ combinations. For most images, the inconsistency in alignment parameters results from numerical errors caused by poor band-to-band correlation. In order to eliminate this inconsistency, it is possible to extend the mutual information equations to multiple dimensions and perform a simultaneous alignment of all bands. However, in the case of 8 VNIR and 8 SWIR bands, joint histograms would be 16-dimensional, and numerical implementation of such a large problem is impractical if not impossible—even if the number of histogram bins is limited to 16, the joint histogram would have $16^{16} \approx 10^{20}$ elements. Ren et al. proposed to replace the N-dimensional registration function with a sum of squares of 2-D MI functions, each one computed independently for every band pair combination. This approach can provide a good solution at coarse scale, but can be noisy at fine scale since the pair-wise registering functions will peak at different alignment values. It also involves computation of registration functions for all band combinations, which can be very time consuming. Instead, we find a way to increase correlation between reference and registering bands by taking a linear combination of reference VNIR bands yielding the highest possible correlation with individual SWIR bands. To this aid we employ Canonical Correlation Analysis (CCA), which was used earlier by Vestergaard and Nielsen, to compute temporal alignment between visible satellite and radar imagery. They reported an increase in correlation between the bands from 0.4 to 0.9, which resulted in more precise image alignment.

Figure 15:
FIG. 15 shows results of applying Canonical Correlation Analysis to improve image correlation. $SWIR_1$ (center) is poorly correlated with $VNIR_{AVE}$ (left), but $SWIR_1$ is strongly correlated with the dominant CCA component $VNIR_{CCA}$ (right).

FIG. 15 shows $VNIR_{AVE}$, $SWIR_1$, and $VNIR_{CCA}$ for a chip of the Denver image. $VNIR_{CCA}$ is the dominant component of the CCA solution and is a weighted combination of all VNIR bands, with the following coefficients (for this particular image) for bands $VNIR_1$ through $VNIR_8$: 0.41, −0.57, −0.20, −0.10, 0.59, −0.10, −0.15, and 0.27. Notice that some coefficients are negative, suggesting that CCA accounts for anti-correlation between the images.

Figure 16:
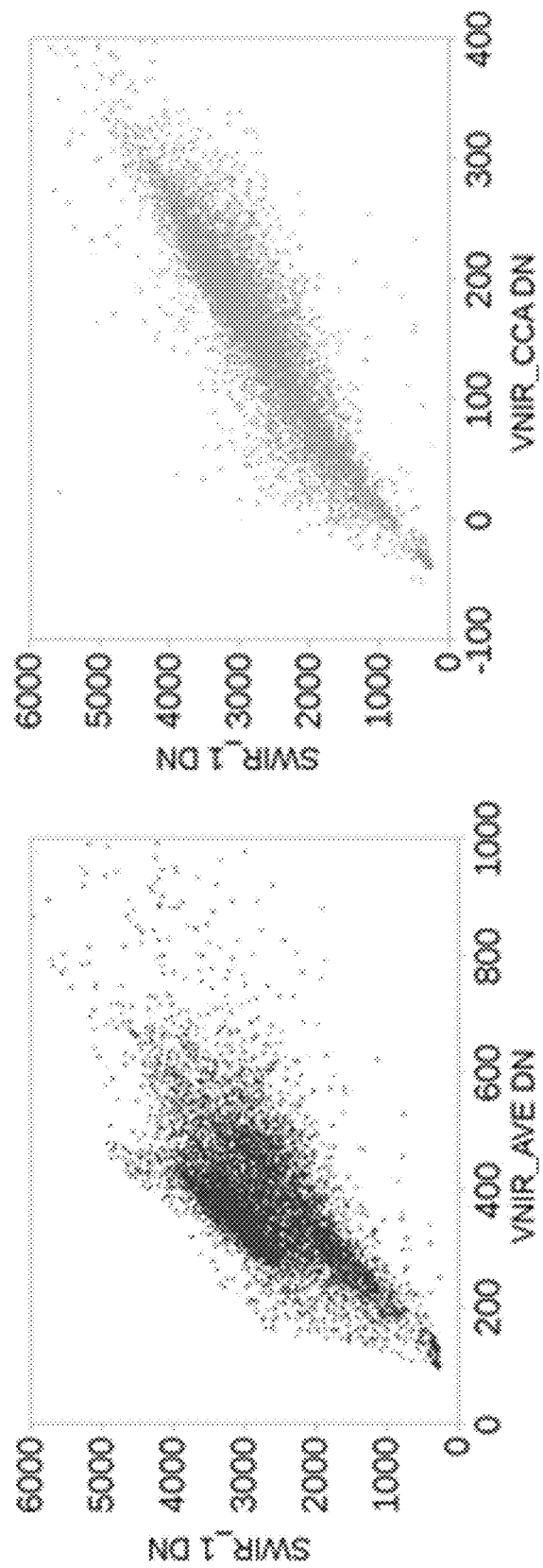
FIG. 16 shows scatter plots of intensities in $VNIR_{AVE}$ and $SWIR_1$ (right), and $VNIR_{CCA}$ and $SWIR_1$ (left) showing advantages of using CCA to improve band to band correlation. Shown are 10000 random data points from the 5000× 5000 Denver image.

$VNIR_{AVE}$ contrasts with $SWIR_1$ more strongly than with $VNIR_{CCA}$. This strong contrast is a manifestation of poor correlation, with small contrast signifying high correlation. The same idea is captured in FIG. 16, which shows intensity of $SWIR_1$ versus VNIR intensity for every image pixel.

Figure 17:
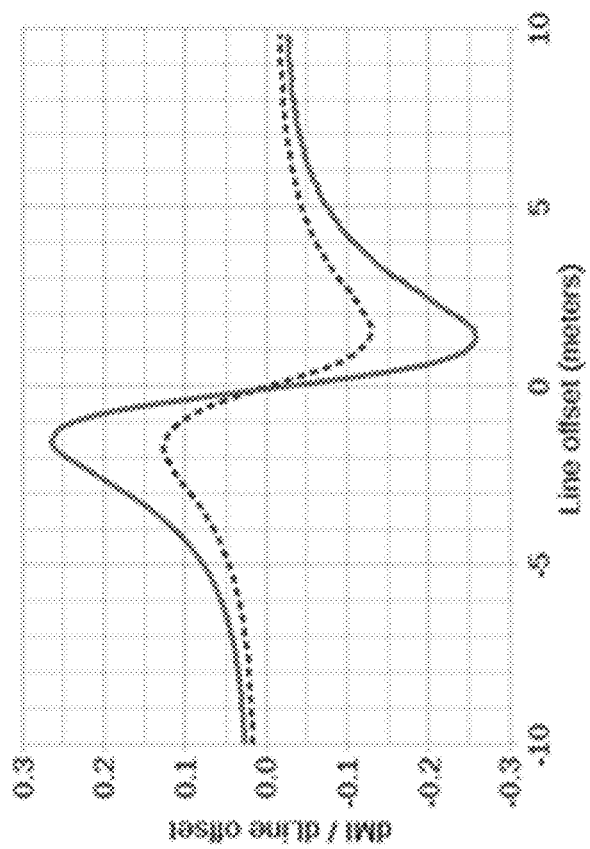
FIG. 17 shows MI registration functions (left) and their derivatives (right), showing the advantages of using Canonical Correlation Analysis to improve image to image alignment.
Figure 17:
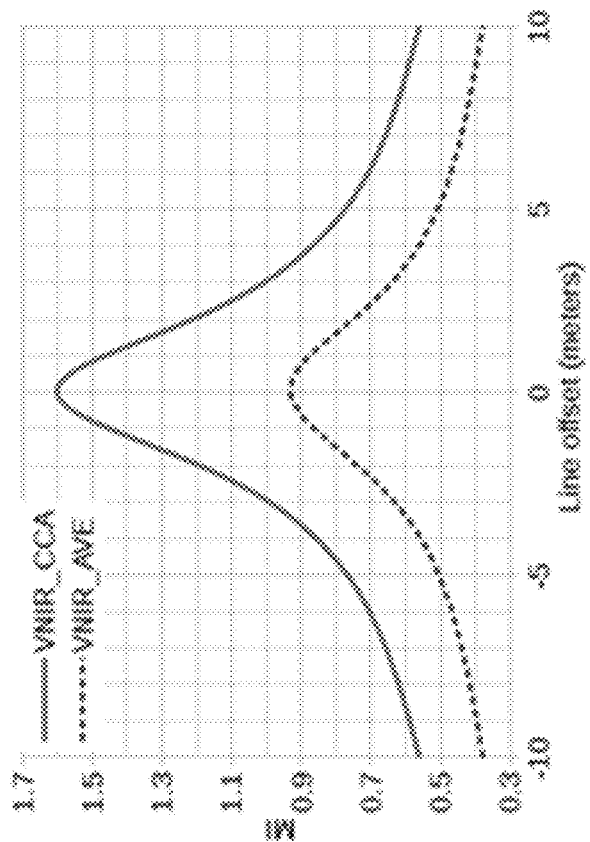

FIG. 17 shows MI registration functions and their derivatives computed for pairs $VNIR_{AVE}$ and $SWIR_1$, and $VNIR_{CCA}$ and $SWIR_1$. It is clear that the registration functions computed with CCA are much more sensitive with respect to alignment coefficients than using the average of all VNIR bands.

Summary of Results for WV-3

Preliminary results indicate that the average VNIR/SWIR alignment offset is approximately 0.35 SWIR pixels at 7.5 m GSD (0.7 pixels at the native resolution of 3.7 m) and SWIR/SWIR intra sensor registration is 0.25 SWIR pixels at 7.5 m GSD (0.5 pixels at 3.7 m). To verify this, and to estimate the final registration accuracy, we compiled results from numerous images across the globe. The locations differed dramatically in land cover, ranging from heavily vegetated, through sparse vegetation, to rural and urban environments. We excluded mountainous and excessively hilly areas in order to eliminate warping effects caused by inaccurate elevation models. We confirm here the overall accuracy of the preliminary report, although many images studies showed VNIR/SWIR alignment errors close to 1 SWIR pixel at the native resolution. We also discovered that the intra band, SWIR/SWIR offset varies monotonically with the SWIR band. The second through the seventh SWIR bands appear to have a similar offset relative to VNIR, whereas the first and the last SWIR bands systematically appear to have a different offset.

Figure 18:
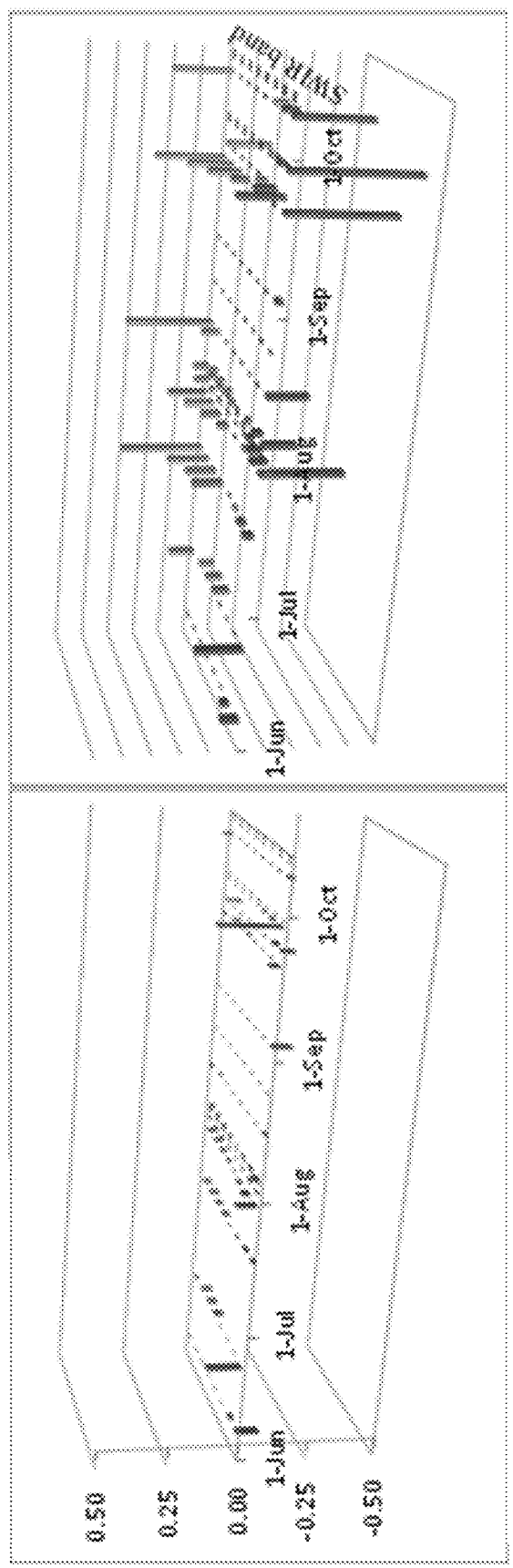
FIG. 18 shows SWIR to VNIR pixel offset in the cross-(left) and along-track directions (right), computed for 18 images collected at different locations. The offset units are in pixels at 3.5 m GSD.

FIG. 18 shows alignment results between all SWIR bands and the VNIR averaged band, using 18 images collected over different sites, across a period of nearly 6 months. As predicted, the cross-track mis-registration is very small, whereas the along-track mis-registration varies between −0.5 and +0.5 SWIR pixels. The 18 images used in this plot are only a small fraction of all images used to derive overall statistics.

Figure 19:
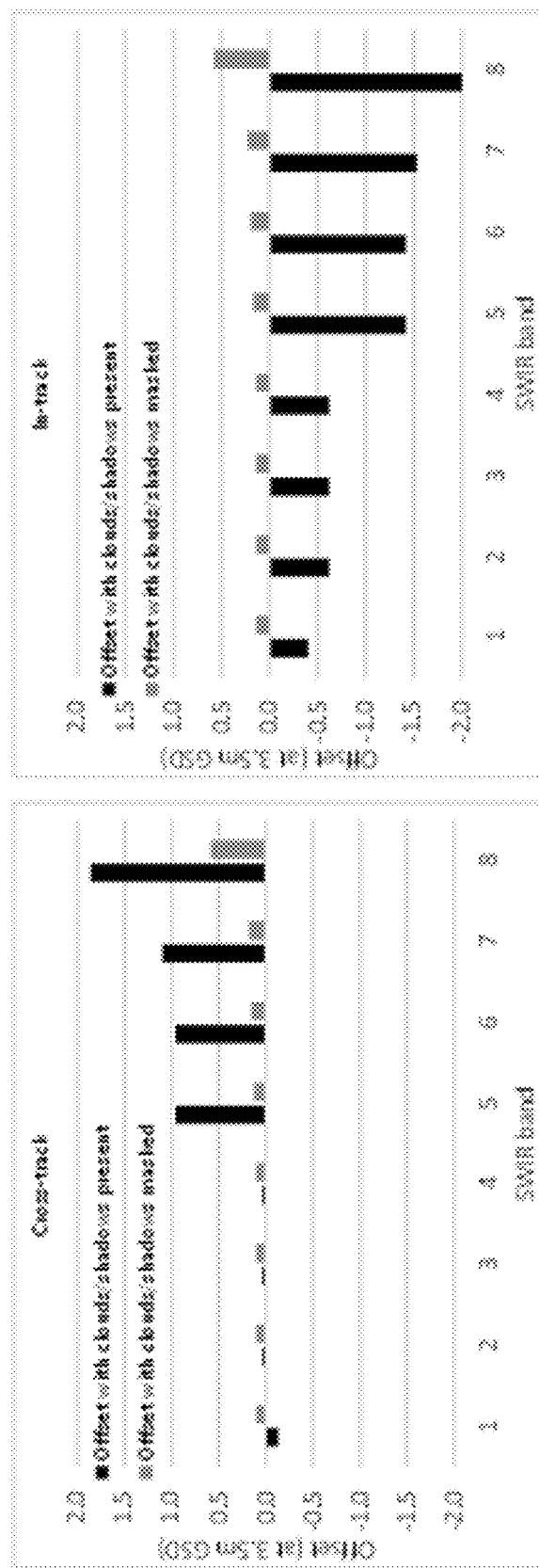
FIG. 19 shows the effects of cloud masking on SWIR to VNIR alignment, computed fora pair of VNIR and SWIR images with 50% of clouds. Left: pixel offset in the cross-track direction; right: pixel offset in the along-track direction.

The images selected for accuracy validations were cloud and water free. Clouds and water bodies have to be masked out prior to computing the alignment offset. The clouds can be significantly shifted between VNIR and SWIR because their height above the ground is not accounted for during ortho-rectification. Assuming that they are at least 1000 meters about the ground, the apparent shift between the clouds imaged in VNIR and SWIR is at least 5 SWIR pixels at native resolution. If an image is 50% cloudy, a registration with clouds included will introduce a shift of 2.5 SWIR pixels, as shown in FIG. 19. Water bodies should also be masked out if waves are present in the image. Waves are apparent in all SWIR, and in red and near-IR VNIR bands. Wave movement, coupled with an approximately 1 second delay between VNIR and SWIR image acquisition, can introduce a spurious shift of a few meters between two such images.

In order to quantify the final alignment accuracy after applying the MI registration correction, we verified the alignment for selected features on the ground which correlate well between VNIR and SWIR, such as roads, road markings, and airport runways. We also developed an approach where we replaced actual, unaligned SWIR images with simulated, aligned images, and computed the resulting registration function peak. The simulated, aligned SWIR images were generated from neural networks which were trained on the actual, unaligned VNIR and SWIR image pairs. These simulated images have spectral features very similar to the original SWIR images, but are properly aligned with VNIR since the neural networks employed were constructed using only spectral, but not spatial, variability. For properly aligned images, the registration function should peak at (0, 0) offset in the line, sample and directions, and a deviation from (0, 0) is the direct measure of alignment error. Our conclusions, based on results obtained with these two methods, are that the final alignment bias between VNIR and all SWIR bands is better than ¼ of a SWIR pixel at 3.7 m GSD.

We have demonstrated a technique for aligning multi-spectral, remote sensing images collected by the high-resolution DigitalGlobe WV-3 satellite. WV-3 has two main instruments: one which collects a broad panchromatic spectrum (PAN) and eight spectral bands in the visible and near-IR range (MS), and the second, which collects eight short-wave infrared bands (SWIR). Since the two instruments observe the ground from slightly different angles, the images are not properly aligned. Geometric calibration and ortho-rectification removes most of the original mis-alignment, with a residual offset in the along-scan direction of about 0.7 SWIR pixels at 3.7 m GSD, and a small offset in the cross-scan direction. This remaining offset is removed on an image-by-image basis using a Mutual Information (MI) technique.

We have evidence that alignment between bands of different modalities is achievable with an accuracy (bias) exceeding ¼ of an image pixel. To achieve this level of accuracy, we employed prior knowledge of sensor noise to estimate signal probability density. This signal probability is very closely linked to standard histograms, but the number of DN occurrences of a given a histogram bin is weighted with the probability of a signal having a given intensity. The latter is driven by measurement noise. We also showed that, in the case of multi-spectral images, sensitivity of MI with respect to alignment parameters can be significantly improved by employing Canonical Correlation Analysis (CCA). CCA provides an optimal linear combination of reference bands (VNIR in the case of WV-3) which best correlates with individual registering bands (SWIR). Finally, we showed that the best way to register images corresponding to different native resolutions is to perform alignment at a low-resolution grid by aggregating a high-resolution image, then performing alignment on a high-resolution grid through cubic resampling.

One quarter pixel accuracy can be achieved provided clouds and water bodies are appropriately masked, and the elevation model is accurate to about 10 meters. Clouds and water bodies must be eliminated during the registration process since unmodeled cloud height and wave movement between the VNIR and SWIR images can adversely affect registration results. Additionally, larger elevation model errors can introduce warping which cannot be removed through rigid body transformation. Published results suggest that the MI technique can be used to alleviate this warping by computing offsets on small image chips. Future work will focus on extending the proposed techniques to handle image registration with poor, or even unknown, elevation models.

At this point, methods and techniques for performing such computer-implemented methods will be discussed. Generally, the techniques disclosed herein may be implemented on any suitable hardware or any suitable combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 20:
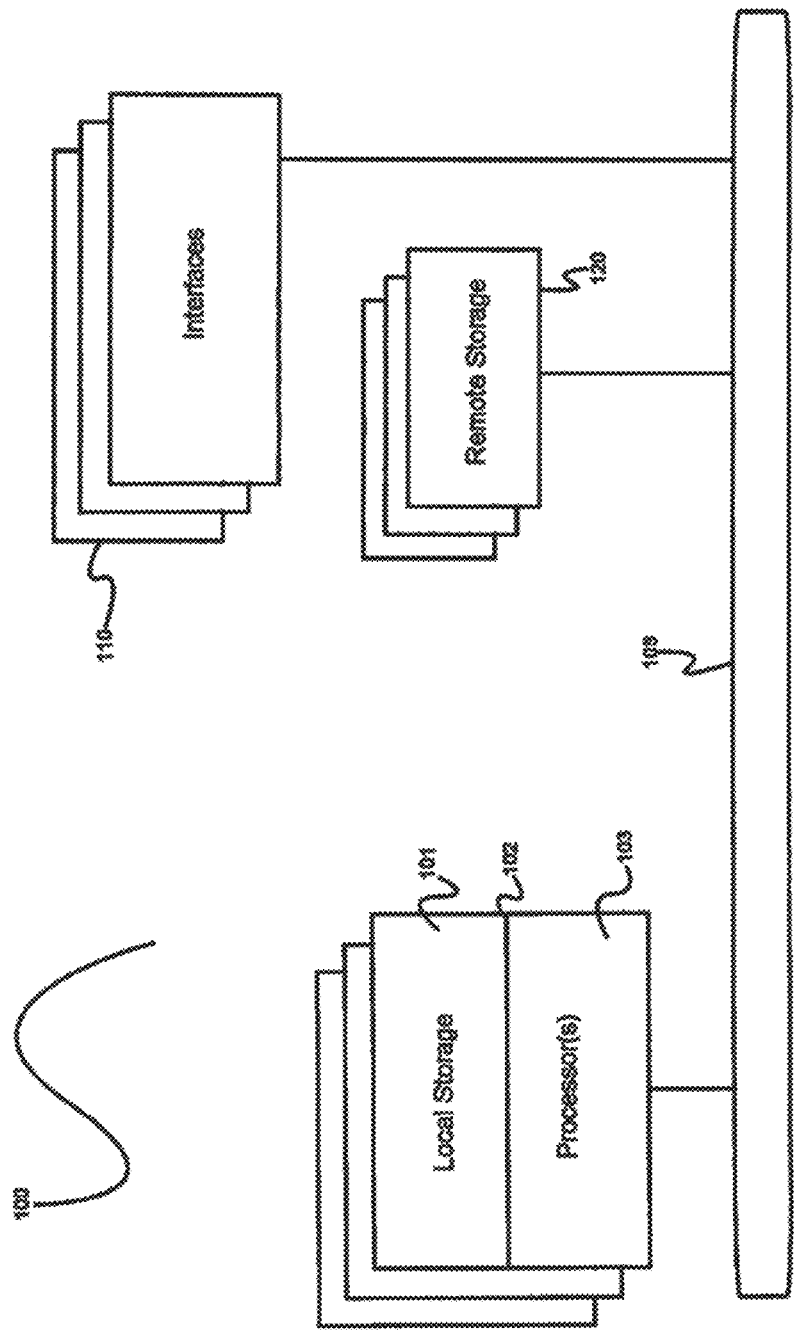
FIG. 20 is a block diagram illustrating an exemplary hardware architecture of a computing device used in an embodiment of the disclosure herein.

Referring now to FIG. 20, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110.

In at least one embodiment, CPU 102 may be caused to perform one or more of the different types of functions and/or operations under the control of software modules or components, which for example, may include an operating system and any appropriate applications software, drivers, and the like. CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 20 illustrates one specific architecture for a computing device 100 for implementing one or more of the embodiments described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 21:
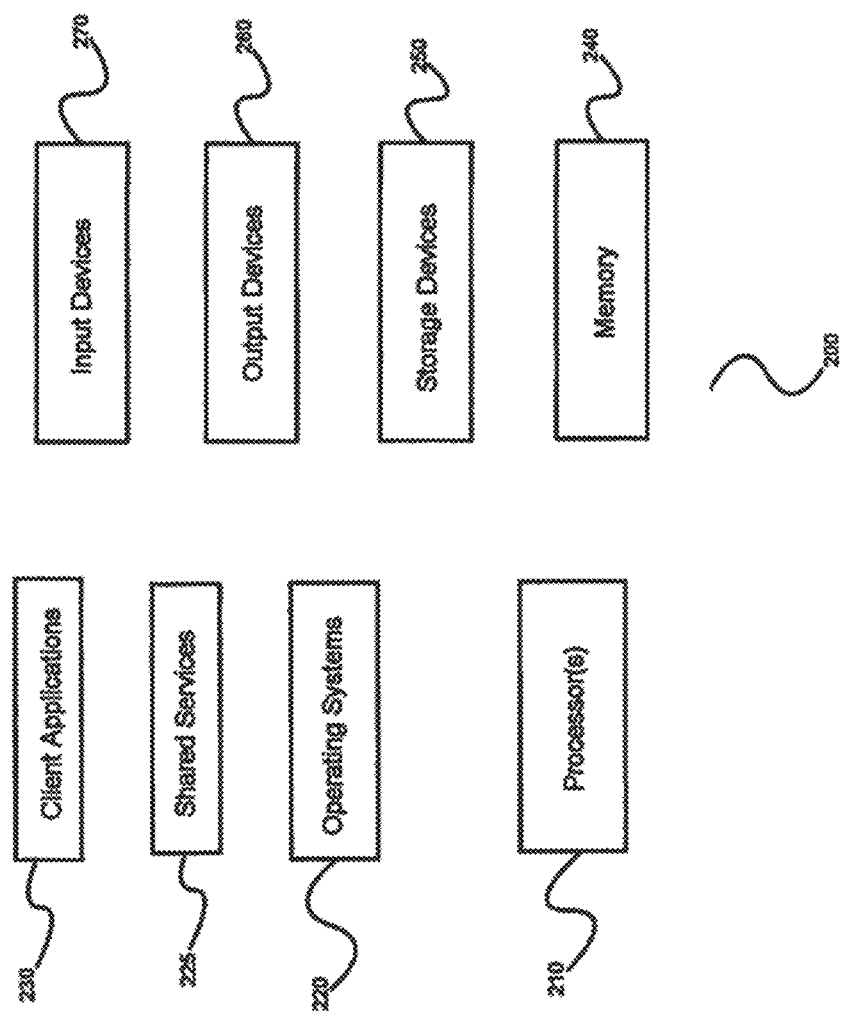
FIG. 21 is a block diagram illustrating an exemplary logical architecture for a client device, according to an embodiment of the disclosure herein.

In some embodiments, systems may be implemented on a standalone computing system. Referring now to FIG. 21, there is shown a block diagram depicting a typical exemplary architecture of one or more embodiments or components thereof on a standalone computing system. Computing device 200 includes processors 210 that may run software that carry out one or more functions or applications of embodiments, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 22:
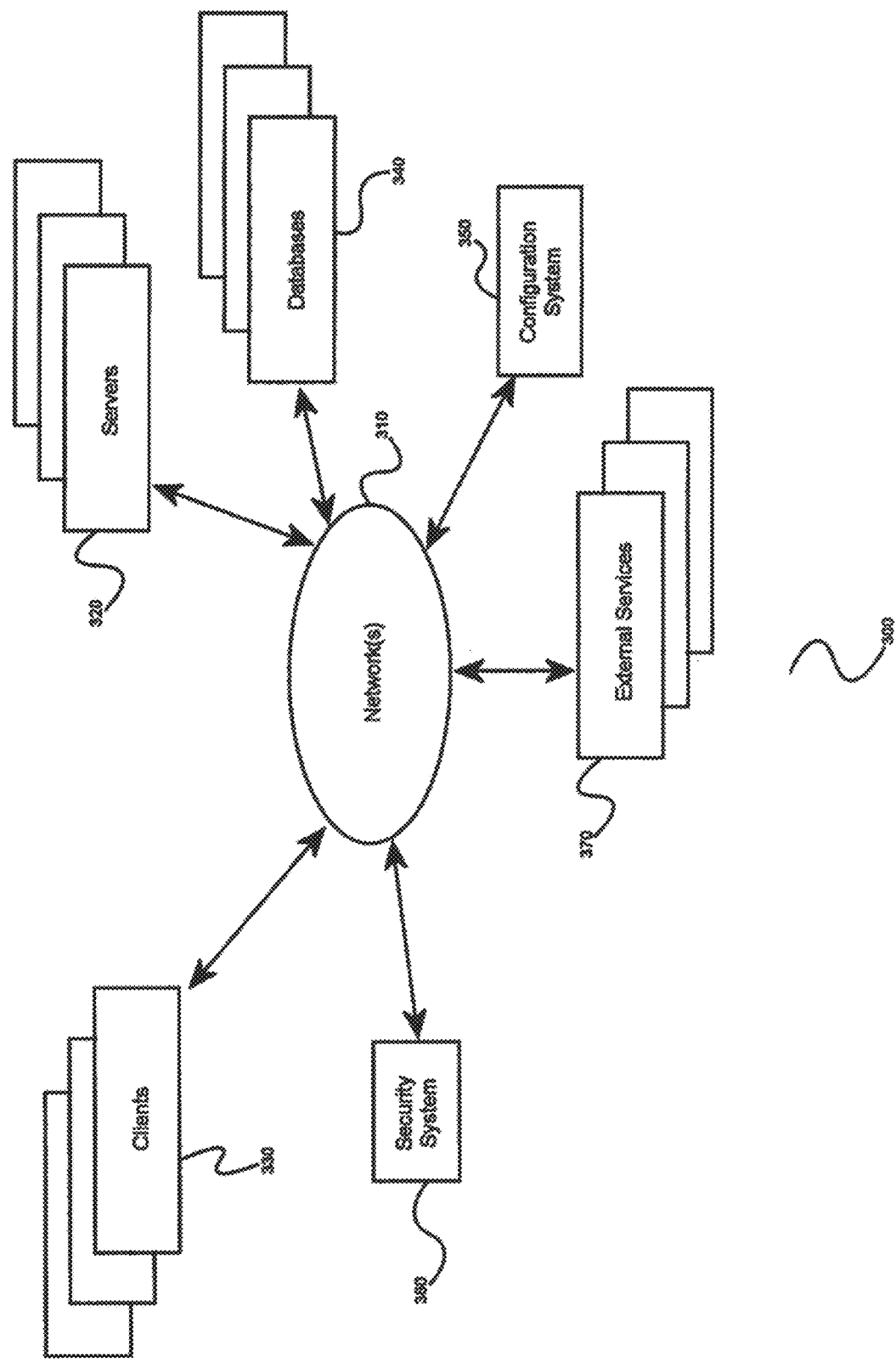
FIG. 22 is a block diagram illustrating an exemplary architectural arrangement of clients, servers, and external services, according to an embodiment of the disclosure herein.

In some embodiments, systems may be implemented on a distributed computing network, such as one having any number of clients and/or servers. Referring now to FIG. 22, there is shown a block diagram depicting an exemplary architecture for implementing at least a portion of a system according to an embodiment on a distributed computing network. According to the embodiment, any number of clients 330 may be provided. Each client 330 may run software for implementing client-side portions of the embodiments and clients may comprise a system 200 such as that illustrated in FIG. 21. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments, clients 330 or servers 320 (or both) may make use of one or more specialized services or appliances that may be deployed locally or remotely across one or more networks 310. For example, one or more databases 340 may be used or referred to by one or more embodiments. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 360 or configuration system 350 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

While the embodiments have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

I claim:

1. A computer-implemented method for co-registering images, the method comprising:
    retrieving at least two images of an area of interest, each of the images being imaged from a different bank of sensors;
    creating a signal intensity histogram of each image, with each histogram being divided into a plurality of bins, with each bin having a bin width;
    cross correlating the two images by cross correlating the two histograms to create a correlation map that represents Mutual Information in the two images; and
    using the peak on the correlation map to register the images with each other;
    wherein the width of each bin of each of the two histograms to be cross-correlated, depends on an amount of noise in the signal intensity within that particular bin.

2. A method as defined in claim 1, wherein the width of each bin increases with increasing signal.

3. A method as defined in claim 1, wherein the width of each bin is related to the square root of the signal.

4. A method as defined in claim 1, wherein the bins are populated by integrating a probability of the signal intensity in each bin.

5. A method as defined in claim 1, further including converting each of the images from top-of-the-atmosphere image data to surface reflectance image data.

6. A method as defined in claim 1, wherein each of the images includes image data at a different spatial resolution from the other image, so that there is a higher-resolution image and a lower-resolution image.

7. A method as defined in claim 1, wherein the noise in the signal intensity is based on the shot noise for the corresponding bank of sensors.

8. A method as defined in claim 1, wherein the width of each bin is based on a common multiplicative constant.

9. A method as defined in claim 1, wherein the width of each bin is the product of a fixed constant and the signal intensity.

10. A method as defined in claim 1, wherein the width of each bin is the product of a fixed constant and the square-root of the signal intensity.

11. A method as defined in claim 1, further comprising using sensor noise to derive Gaussian probability and using the Gaussian probability for the cross correlating.

12. A method as defined in claim 1, further comprising:
    identifying an existence of a high amount of aerosols in the atmosphere; and
    populating the bins by integrating a probability of the signal intensity in each bin, wherein the populating is executed in response to the identifying.

13. A method as defined in claim 1, wherein the width of each bin increases with increasing noise.

14. A method as defined in claim 13, wherein each of the images includes image data at a different spatial resolution from the other image, so that there is a higher-resolution image and a lower-resolution image.

15. A method as defined in claim 13, further including converting each of the images from top-of-the-atmosphere image data to surface reflectance image data.

16. A method as defined in claim 13, wherein the bins are populated by integrating a probability of the signal intensity in each bin.

17. A method as defined in claim 16, wherein each of the images includes image data at a different spatial resolution from the other image, so that there is a higher-resolution image and a lower-resolution image.

18. A method as defined in claim 16, further including converting each of the images from top-of-the-atmosphere image data to surface reflectance image data.

19. A method as defined in claim 18, wherein each of the images includes image data at a different spatial resolution from the other image, so that there is a higher-resolution image and a lower-resolution image.

* * * * *